June 9, 1931. N. F. MURRAY 1,808,993
PATTY FORMING DEVICE
Filed Oct. 28, 1929 2 Sheets-Sheet 1

Inventor
N. F. Murray
By Clarence A. O'Brien
Attorney

June 9, 1931. N. F. MURRAY 1,808,993
PATTY FORMING DEVICE
Filed Oct. 28, 1929   2 Sheets-Sheet 2
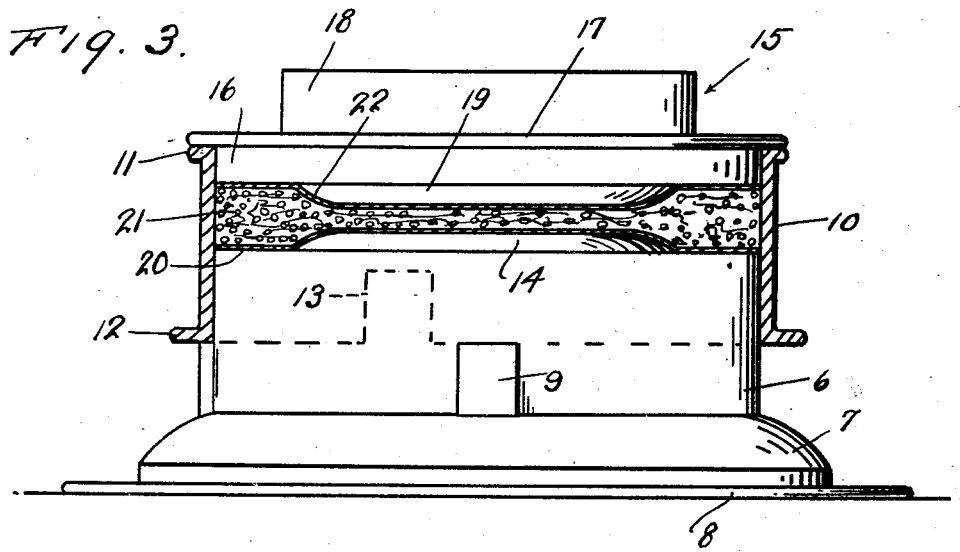
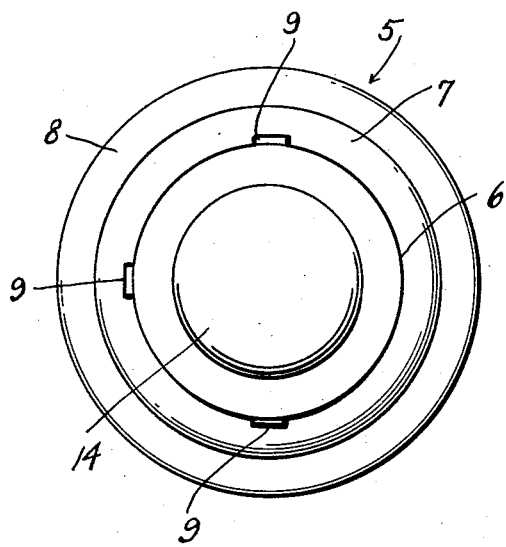
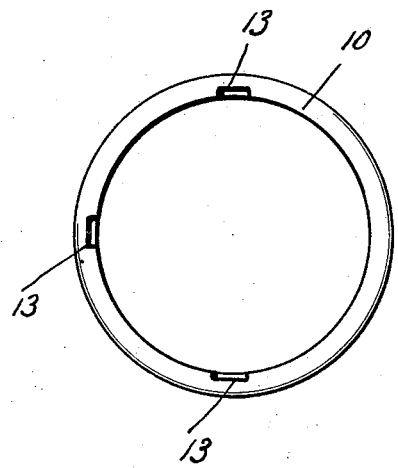
Inventor
N. F. Murray
By Clarence A. O'Brien
Attorney Patented June 9, 1931

1,808,993

UNITED STATES PATENT OFFICE

NORRIS FEY MURRAY, OF HINSDALE, ILLINOIS

PATTY FORMING DEVICE

Application filed October 28, 1929. Serial No. 402,980.

This invention appertains to new and useful improvements in food preparing devices and more particularly to a device for forming hamburger or other varieties of meat patties, preparatory to cooking. Heretofore patties have been formed by hand which is obviously unsanitary and which requires the services in one skilled in this particular work, as it is necessary that the filled patties be somewhat thinner at their central portions than at their edges so that the expansion during cooking will be uniform.

The principal object of this invention is to provide a patty forming device which will serve to form a patty in a quick and efficient manner and without requiring the pressing of the patty by hand.

During the course of the following specification and claim, numerous other important objects and advantages of the invention will become more apparent.

In the drawings:

Figure 3 represents a vertical sectional view through the upper portion of the device.

Figure 4 represents a reduced top plan view of the base of the device.

Figure 5 represents a bottom plan view of the slidable sleeve.

Figure 1:
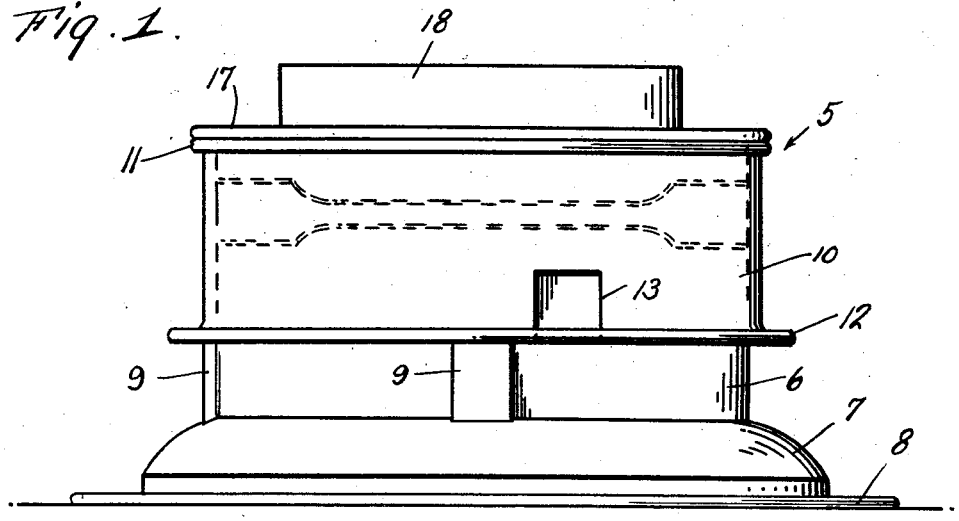
Figure 1 represents a side elevation of the patty forming device in a position prior to the compressing of the patty.
Figure 2:
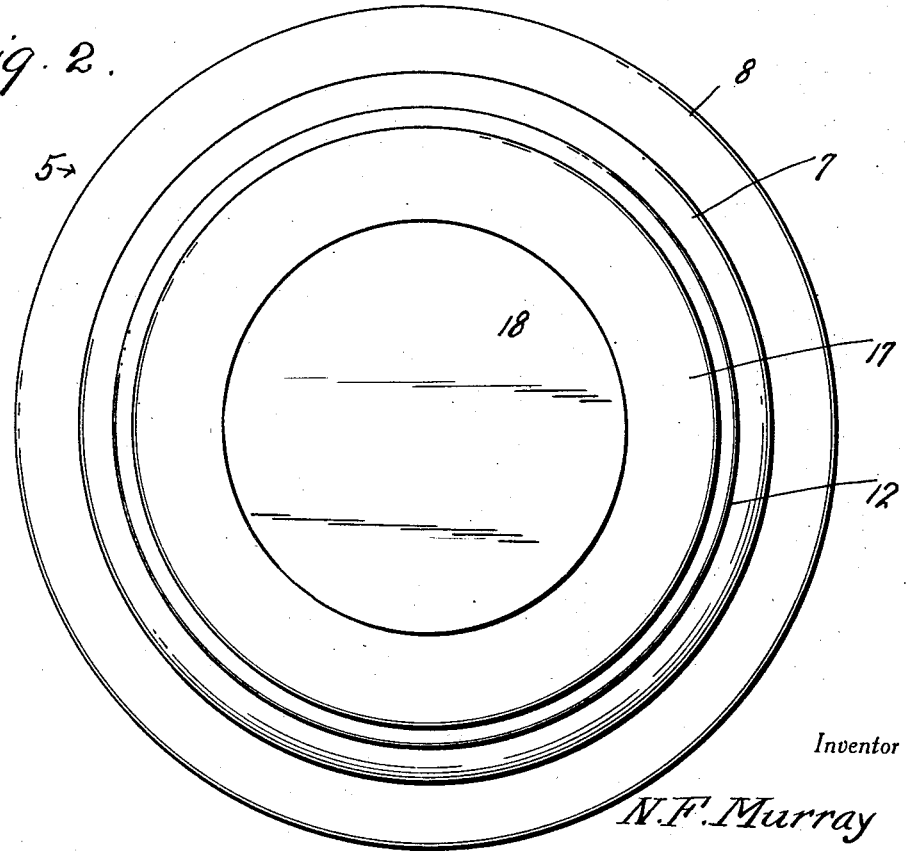
Figure 2 represents a top plan view of the device.

Referring to the drawings wherein like numerals designate like parts, it will be seen that the novel device includes a base which is generally referred to by numeral 5. (See Figure 4.) This base comprises a cylindrical column 6 having a transversely curved shoulder 7 at its lower portion and a circumferentially extending flange 8 projecting from the shoulder 7 in the manner shown clearly in Figure 3. The column 6 is provided with a plurality of upwardly extending cleats or formed lugs 9 formed on the shoulder 7 and extending partially across the peripheral surface of the column.

As is clearly shown in Figure 3, these cleats, or formed lugs do not extend to the upper end of the column 6 but terminate substantially midway between the upper and lower ends of the said column. A sleeve 10 is provided for snug slidable disposition on the column 6 and is flanged at its upper and lower ends as denoted by numerals 11 and 12.

The sleeve is provided with a plurality of recesses 13 conforming in shape with the cleats or formed lugs 9. There is a number of these recesses equal in number to the cleats or formed lugs 9 and of the same spaced relation, so that when the sleeve 10 is properly set so that the recesses 13 register with the cleats or formed lugs 9, the sleeve 10 may slide downwardly on the column 6.

As is clearly shown in Figures 3 and 4, the top of the column 6 is provided with a convex protuberance 14 which has its outer boundaries a substantial distance inwardly from the periphery of the column and in concentric relation with respect thereto.

A compressor, which is generally referred to by numeral 15 is employed in conjunction with this device and includes a plate 16 which is adapted to fit snugly within the sleeve 10, it being sufficiently loose to permit detachment therefrom. This plate is provided with a circumferentially extending flange 17 and a weighted enlargement 18 on its top side. The bottom side of the plate 16 is provided with a convex protuberance 19 which has its outer boundaries coincident with respect to the boundaries of the protuberance 14 when the plate 16 is inserted within the sleeve 10.

It will thus be seen that disc 20 of paraffine or waxed paper may be placed upon the upper end of the column 6 when the sleeve 10 is in the position shown in Figure 3. The sleeve may then be partly filled with the material (meat) 21 until a sufficient amount to form a patty is present. Then a second disc of paraffine paper, denoted by 22, is placed upon the meat, after which the compressor 15 is placed in the position shown in Figure 3.

Now by rotating the sleeve 10 the cleats or formed lugs 9 will register with the recesses 13 and the sleeve may be permitted to drop downwardly on the column, allowing the patty to be removed by sliding from the top of the column. Obviously, the weight of the compressor and any other force the operator wishes to apply will tend to compress the patty. After this compressing operation of the patty, the patty may be removed and in its finished form, the patty will have its intermediate portion contracted, so that in cooking, this portion will expand uniformly with respect to the edge portion.

In cooking the patty, one paper disc may be removed from one side, and this side is exposed to the hot plate or pan, and when the patty is ready to be inverted, the other paper disc may be removed.

It will be observed that this device makes it unnecessary that the patty be touched by human hands and this obviously tends to promote sanitation.

While the foregoing description sets forth the invention in definite terms, it is to be understood that various changes in the shape, size and materials may be resorted to without departing from the spirit and scope of the invention as claimed hereinafter.

Having thus described the invention, what I claim as new is:

A food forming device of the character described comprising a base, an upwardly extending body on the base, a sleeve slidable on the body, said sleeve being open at its upper end, means for maintaining the sleeve in a position projecting a substantial distance above the top of the body, and a member for closing the upper end of the sleeve when the base within the confines of the sleeve has been filled with food, said means for maintaining the sleeve elevated comprising a plurality of cleats or formed lugs on the said body upon which the lower end of the sleeve may rest and which engages into recesses on the said sleeve when the sleeve is rotated to register said recesses with the cleats.

In testimony whereof I affix my signature.

NORRIS FEY MURRAY.